United States Patent
Rifkin et al.

(10) Patent No.: US 9,319,096 B1
(45) Date of Patent: Apr. 19, 2016

(54) ULTRASONIC COMMUNICATION BETWEEN DEVICES

(71) Applicant: Google Inc., Mountain View, CA (US)

(72) Inventors: Ryan Michael Rifkin, San Francisco, CA (US); Richard Francis Lyon, Los Altos, CA (US); Pascal Tom Getreuer, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/288,137

(22) Filed: May 27, 2014

(51) Int. Cl.
*H04B 1/69* (2011.01)
*H04B 1/707* (2011.01)
*H04B 1/713* (2011.01)
*H04B 1/7075* (2011.01)
*H04B 1/709* (2011.01)

(52) U.S. Cl.
CPC ............ *H04B 1/70752* (2013.01); *H04B 1/709* (2013.01); *H04B 2201/70718* (2013.01)

(58) Field of Classification Search
CPC ................. H04B 1/7052; H04B 1/709; H04B 2201/70718
USPC ......... 375/147, 149, 150, 152, 142, 143, 145; 370/320, 335, 342; 367/137, 178
See application file for complete search history.

(56) References Cited

U.S. PATENT DOCUMENTS 7,505,823 B1 * 3/2009 Bartlett et al. .................. 700/94
7,796,978 B2 * 9/2010 Jones et al. ................ 455/414.3

OTHER PUBLICATIONS

Mohammed Alloula and Mike Hazas. An efficient CDMA core for indoor acoustic position sensing. In Indoor Positioning and Indoor Navigation (IPIN), 2010 International Conference on, pp. 1-5, Sep. 2010.
Robert J. Baxley, Chunming Zhao, and G. Tong Zhou. Constrained clipping for crest factor reduction in OFDM. IEEE Transactions on Broadcasting, 52, 2006.
Kiho Cho, Jae Choi, Hwan Sik Yun, and Nam Soo Kim. Spectral magnitude adjusted data hiding in mclt domain of audio signal for robust acoustic data transmission. AP-SIPA ASC 2011 Xi'an, 2011.
Aditya Dhananjay, Ashlesh Sharma, Michael Paik, Jay Chen, Trishank Karthik Kup-pusamy, Jinyang Li, and Lakshminarayanan Subramanian. Hermes: data transmission over unknown voice channels. MOBICOM, pp. 113-124, 2010.
Robert C. Dixon. Spread Spectrum Techniques. IEEE Press Selected Reprint Series, 1976.
Poulami Dutta, Debnath Bhattacharyya, and Tai Hoon Kim. Data hiding in audio signal: A review. International Journal of Database Theory and Application, 2, 2009; 8 Pages.
Laura Galluccio, Tommaso Melodia, Sergio Palazzo, and Giuseppe Enrico Santagati. Challenges and implications of using ultrasonic communications in intra-body area networks. In Wireless On-demand Network Systems and Services (WONS), 2012 9th Annual Conference on, pp. 182-189, Jan. 2012.
Robert Gold. Optimal binary sequences for spread spectrum multiplexing. 13:619-621, 1967.

(Continued)

*Primary Examiner* — Phuong Phu

(57) ABSTRACT

Implementations generally relate to ultrasonic communication between devices. In some implementations, a method includes receiving a data signal, where the data signal is transmitted and received in an indoor environment. The method further includes demodulating the data signal based on direct sequence spread spectrum.

15 Claims, 14 Drawing Sheets

(56) References Cited

OTHER PUBLICATIONS

Mike Hazas and Andy Ward. A novel broadband ultrasonic location system. In Gaetano Borriello and Lars Erik Holmquist, editors, UbiComp 2002: Ubiquitous Computing, vol. 2498 of Lecture Notes in Computer Science, pp. 264-280. Springer Berlin Heidelberg, 2002.

Darko Kirovski and Henrique Malvar. Robust covert communication over a public audio channel using spread spectrum. pp. 354-368, 2001.

Nevena Lazic and Parham Aarabi. Communication over an acoustic channel using data hiding techniques. IEEE Transactions on Multimedia, 8, 2006.

C.V. Lopes and P.M.Q. Aguiar. Aerial acoustic communications. In Applications of Signal Processing to Audio and Acoustics, 2001 IEEE Workshop on the, pp. 219-222, 2001.

Marvin K. Simon, Jim K. Omura, Robert A. Scholtz, and Barry K. Levitt. Spread Spectrum Communications Handbook. McGraw-Hill, 1994.

Nicholas Michael Vallidis. Whisper: A Spread Spectrum Approach to Occlusion in Acoustic Tracking. PhD thesis, 2002. Doctoral Dissertation.

Robert G. Winch. Telecommunication Transmission Systems. McGraw-Hill, 1998; pp. 124-133.

Pascal Getreuer et al.; Robust Ultrasonic Communication Using Consumer Hardware; Apr. 30, 2014; 18 pages.

* cited by examiner

400

700

1000

Raw Acquisition

1100

1200

ULTRASONIC COMMUNICATION BETWEEN DEVICES

BACKGROUND

Some mobile applications enable users to participate in social activities where devices of users can communicate with other devices that are physically close by. For example, users may want to locate other users in the same physical location. In another example, users may have taken some photos of each other and may want to share their photos with each other.

SUMMARY

Implementations generally relate to ultrasonic communication between devices. In some implementations, a method includes receiving a data signal, where the data signal is transmitted and received in an indoor environment. The method further includes demodulating the data signal based on direct sequence spread spectrum.

With further regard to the method, in some implementations, the data signal has a pedestal component. In some implementations, the data signal is ultrasonic. In some implementations, the demodulating of the data signal includes immediately acquiring synchronization of the data signal based on an approximated cross-correlation of a first symbol of the data signal. In some implementations, the demodulating of the data signal includes: downconverting the data signal; approximating cross-correlation of the downconverted data signal; and despreading the downconverted data signal. In some implementations, the demodulating of the data signal includes: downconverting the data signal; approximating cross-correlation of the downconverted data signal; despreading the downconverted data signal; and determining a frequency uncertainty based on the approximated cross-correlation. In some implementations, the demodulating of the data signal includes: detecting a first symbol of the data signal; partitioning the first symbol into a plurality of chunks; and approximating cross-correlation of each chunk. In some implementations, the demodulating of the data signal includes: detecting a first symbol of the data signal; partitioning the first symbol into a plurality of chunks; and approximating cross-correlation of each chunk, where the approximating of the cross-correlation is based on a constant phase over each chunk. In some implementations, the demodulating of the data signal includes: detecting a first symbol of the data signal; partitioning the first symbol into a plurality of chunks; approximating cross-correlation of each chunk; and determining a frequency uncertainty for a plurality of frequencies based on the approximated cross-correlation. In some implementations, the demodulating of the data signal includes: detecting a pedestal component in the data signal; correlating the pedestal; and determining which phase to measure data symbol wave correlations.

In some implementations, a method includes receiving a data signal, where the data signal is transmitted and received in an indoor environment. The method further includes demodulating the data signal based on direct sequence spread spectrum. In some implementations, the demodulating of the data signal includes: downconverting the data signal; approximating cross-correlation of the downconverted data signal, where the approximating is based on partitioning of a first symbol into a plurality of chunks and cross-correlating each chunk; despreading the downconverted data signal; and determining a frequency uncertainty based on the approximated cross-correlation.

In some implementations, a system includes one or more processors, and logic encoded in one or more tangible media for execution by the one or more processors. When executed, the logic is operable to perform operations including: receiving a data signal, where the data signal is transmitted and received in an indoor environment; and demodulating the data signal based on direct sequence spread spectrum.

With further regard to the system, in some implementations, the data signal has a pedestal component. In some implementations, the data signal is ultrasonic. In some implementations, to demodulate the data signal, the logic when executed is further operable to perform operations including immediately acquiring synchronization of the data signal based on an approximated cross-correlation of a first symbol of the data signal. In some implementations, to demodulate the data signal, the logic when executed is further operable to perform operations including: downconverting the data signal; approximating cross-correlation of the downconverted data signal; and despreading the downconverted data signal. In some implementations, to demodulate the data signal, the logic when executed is further operable to perform operations including: downconverting the data signal; approximating cross-correlation of the downconverted data signal; despreading the downconverted data signal; and determining a frequency uncertainty based on the approximated cross-correlation. In some implementations, to demodulate the data signal, the logic when executed is further operable to perform operations including: detecting a first symbol of the data signal; partitioning the first symbol into a plurality of chunks; and approximating cross-correlation of each chunk. In some implementations, to demodulate the data signal, the logic when executed is further operable to perform operations including: detecting a first symbol of the data signal; partitioning the first symbol into a plurality of chunks; and approximating cross-correlation of each chunk, where the approximating of the demodulation is based on a constant phase over each chunk. In some implementations, to demodulate the data signal, the logic when executed is further operable to perform operations including: detecting a first symbol of the data signal; partitioning the first symbol into a plurality of chunks; approximating cross-correlation of each chunk; and determining a frequency uncertainty for a plurality of frequencies based on the approximated cross-correlation.

DETAILED DESCRIPTION

Figure 1:
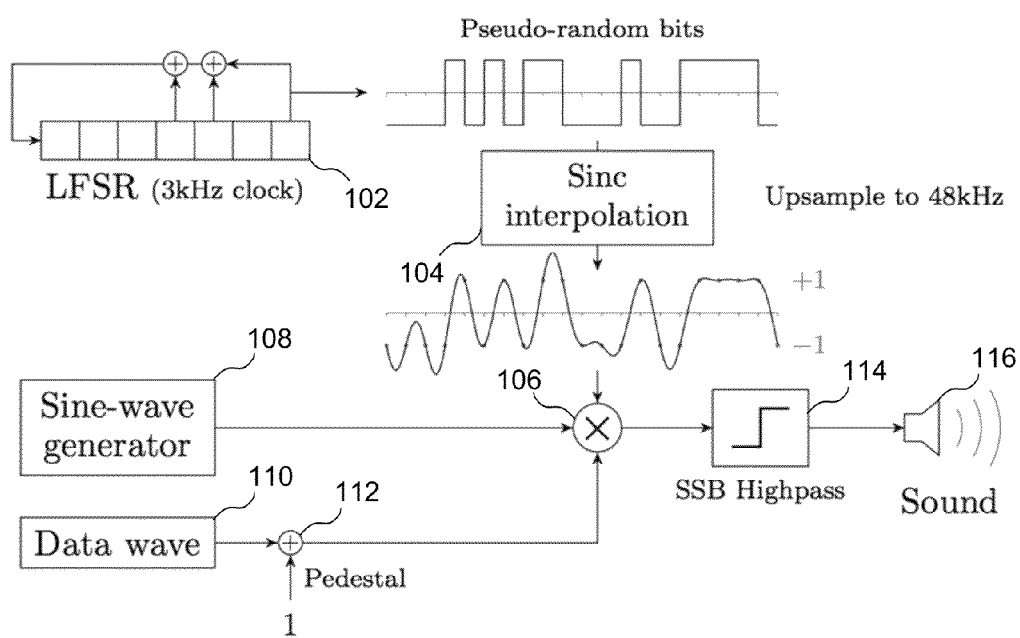
FIG. 1 illustrates a block diagram of an example modulation system, according to some implementations.

Implementations described herein provide ultrasonic communication between devices. Implementations provide a communication protocol for using direct sequence spread spectrum (DSSS) to send data between devices. In various implementations, the system uses DSSS to transmit data as ultrasonic sound between audio devices. Implementations apply across the vast majority of mobile devices such as smartphones, tablets, laptops, etc. As described in more detail below, implementations enable transmission of small amounts of data payload (e.g., 20-bits to 144-bits, etc.) as ultrasonic sound over short distances indoors. While some implementations are described herein in the context of indoor environments, these implementations also apply to outdoor environments. Being based on DSSS, implementations are highly robust to narrowband noise. Implementations also enable communication in noisy, real-world environments, and at moderate distances (e.g., 10 ft., etc.), where multiple devices are trying to communicate. Implementations utilize audio technology for co-presence, enabling users to know whether two devices are collocated. Implementations enable a device, by listening, to determine if a collocated device is using audio, and whether the collocated device is using DSSS.

Implementations described herein address the main challenges such as multiple propagation paths, reverberation, interference, Doppler shift from relative motion between devices, and hardware limitations of speakers and microphones. For use on mobile devices, it is also desirable to constrain computation and battery consumption.

In various implementations, a system receives a data signal, where the data signal is transmitted and received in an indoor environment. In some implementations, the data signal has a pedestal component. In some implementations, the data signal is ultrasonic. The system then demodulates the data signal based on direct sequence spread spectrum. In various implementations, to demodulate the data signal, the system immediately acquires synchronization of the data signal based on an approximated cross-correlation of a first symbol of the data signal.

In various implementations, to demodulate the data signal, the system downconverts the data signal, approximates cross-correlation of the downconverted data signal, and then despreads the downconverted data signal. In various implementations, the cross-correlation is used on the downconverted signal to detect and synchronize with the symbols. Once the synchronization of the symbols is known, they are demodulated to obtain the data. In some implementations, to demodulate the data signal, the system detects a first symbol of the data signal, partitions the first symbol into a plurality of chunks, and then approximates cross-correlation of each chunk based on a constant phase over each chunk. In some implementations, to demodulate the data signal, the system detects a pedestal component in the data signal, correlates the pedestal and determines which phase to measure data symbol wave correlations, and then determines a frequency uncertainty for a plurality of frequencies based on the approximated cross-correlation.

The following describes implementation aspects of discrete DSSS modulation in the discrete setting in terms of sequences.

Continuous cross-correlation of two functions x(t) and y(t) is denoted by ★, $$(x \star y)(t) := \int_{-\infty}^{\infty} \overline{x(s)} y(s+t) ds. \quad (1)$$

Discrete sequences are denoted with subscripts, e.g., $x_n$. Define analogously the discrete cross-correlation of two sequences $x_n$ and $y_n$ by $$(x \star y)_n := \sum_{m=-\infty}^{\infty} \overline{x_m} y_{m+n}. \quad (2)$$

The continuous Fourier transform is denoted by ˆ accent, using the following normalization, $$\hat{x}(f) := \int_{-\infty}^{\infty} x(f) e^{-i2\pi ft} dt. \quad (3)$$

The following is a glossary of notations, which may apply to implementations described herein.

$c_n$ Discrete pseudonoise code sequence of period N
$c(t)$ Sinc interpolation of $c_n$ of period $T_s$
$T_c$ Duration of a chip, $T_s/N$
$d^k(t)$ Data wave encoding the kth symbol value, $k \in \{0, \ldots, K\}$
$f_c$ Sinusoidal carrier frequency
$h^{SSB}$ Highpass filter with cutoff $f_c$ for selecting the upper sideband
$\tau_0$ The time of arrival or code phase
$\delta_0$ Doppler shift of the carrier frequency
$b^{raw}(t)$ Raw baseband signal
$b(t)$ Filtered baseband signal $b = h^{band} * b^{raw}$
$a(\tau, \delta)$ Modulated cross-correlation of c and b
$\Delta$ Set of Doppler frequency offsets $\delta$ considered in acquisition
$a^{normalized}$ Normalized acquisition scores The following describes a code sequence, which may apply to implementations described herein. In various implementations, the system uses a fairly short pseudo-random code sequence (e.g., 127 chips, or code bits), repeating once per data symbol, and modulating its amplitude with orthogonal waveforms to encode different symbol values (e.g., using 16 symbol values for data, 4 bits per symbol, plus one extra symbol value as a framing symbol). Short pseudo-random code sequences of around 100+ chips are unusual compared to the more common use of 1000+ chips. In various implementations, using fewer chips (e.g., in the 100+ range) decreases code synchronization search space, which is less costly in computation.

The code sequence ($c_n$) is an N-periodic pseudorandom sequence of +1 and −1 values. Each period may be $mN \le n < (m+1)N$ one frame of the sequence. Since $(\pm 1)^2 = 1$, the operation of pointwise multiplication by $c_n$ is its own inverse (an involution), $c_n \cdot c_n = 1$. There exist sequences of this type, e.g., generated with a linear feedback shift register, such that c is nearly orthogonal to itself for all nonzero shifts modulo the period, $$(c \star c)_n := \sum_{m=0}^{N-1} c_m c_{m+n} = \begin{cases} N & n = 0 \mod N, \\ -1 & n \neq 0 \mod N. \end{cases} \quad (4)$$

The following describes a data sequence, which may apply to implementations described herein. In some implementations, let $(d_n)$ be the data sequence, where each frame has zero mean and represents one information symbol $k \in \{0, \ldots, K-1\}$. To form this sequence, let $d^0, \ldots, d^K$ be a set of (K+1) orthogonal zero-mean length-N sequences, and set $d_n = d_n^k$, $mN \leq n < (m+1)N$, to encode symbol value k in the mth frame.

In various implementations, the system adds these orthogonal sinusoid envelopes to a constant +1 pedestal in order to make all-positive modulating amplitudes. In some implementations, the pedestal is a steady code signal component. In some implementations, the pedestal is modulated by the carrier (but not by data) to which a data-modulated component is added. In various implementations, the acquisition process detects this pedestal component. As described in more detail below, this optimizes synchronization. The receiver looks for a strong correlation with the code sequence, while ignoring the data modulation until synchronization is achieved.

Of all the approximations and degradations from what an optimal receiver would do, probably the biggest effect is using more than half the transmit power for the pedestal. This makes the synchronization easier and more robust than it would be otherwise. Using the pedestal also avoids the need for complicated "tracking" or phase-locked loops as do most systems that try to operate near the edge of what's theoretically possible.

With regard to encoding and decoding, the data sequence is spread with the code sequence by pointwise multiplication as $$x_n = c_n \cdot (d_n + 1). \quad (5)$$

The offset by one is a pedestal that is used by the receiving side to synchronize the frames. The frame phase is acquired by locating large values in the cross-correlation with c, $$(c \square x)_n = \square(c \square (c \cdot d))_n \square + (c \square c)_n. \quad (6)$$

The second term is from equation 4 and the first term $c\square(c \cdot d)$ is probably small because c is noise-like, and therefore the correlation $c\square x$ is N at $n=0 \mod N$ and small otherwise. Once the frame phase is determined, the involution property allows to recover the data payload by pointwise multiplication with $c_n$, $$c_n \cdot x_n = (c_n)^2 \cdot (d_n + 1) = d_n + 1. \quad (7)$$

Finally, in each frame, the information symbol k is decoded as the largest inner product, $$k = \underset{j}{\operatorname{argmax}}(d^j, c \cdot x). \quad (8)$$

In some implementations, with regard to incoherence of c and $c \cdot d$, to make precise that the above claim that $c\square(c \cdot d)$ in equation 6 is probably small, the following shows a pointwise bound.

The following describes a theorem, which may apply to implementations described herein. Model $(c\_n)$ as an infinite aperiodic sequence of i.i.d. binary values equally likely to be 1 or −1. Suppose that $(d_n)$ satisfies $\square \Sigma_{m=0}^{N-1} d_{m+n} = 0$ for any $n=0 \mod N$. Then for $n=0 \mod N$, $$|(c^*(c \cdot d))_n| = 0, \quad (9)$$

and for $n \neq 0 \mod N$, $$P[|(c \star (c \cdot d))_n| \geq \epsilon N] \leq 2\exp\left(-\frac{1}{2}\epsilon^2 N / c\right), \quad (10)$$

where $$c = \frac{1}{N} \sum_{m=0}^{N-1} d_{m+n}^2$$

is the average power of d over the period.

The following is a proof, which may apply to implementations described herein. For $n=0 \mod N$, the result follows from the assumption that d is zero-mean, $\Sigma_{m=0}^{N-1} c_m^2 d_{m+n} = 0$. For $n \neq 0 \mod N$, $$(g \star (g \cdot d))_n = \sum_{m=0}^{N-1} c_m c_{m+n} d_{m+n}.$$

The expected value is zero since $E[c_m c_{m+n}] = E[c_m] E[c_{m+n}] = 0$, and the mth summation term is either $+d_{m+n}$ or $-d_{m+n}$. Applying Hoeffding's inequality obtains the result $$P\left[\left|\sum_m c_m \cdot c_{m+n} \cdot d_{m+n}\right| \geq \epsilon N\right] \leq 2\exp\left(-\frac{\epsilon^2 N^2}{2 \sum_{m=0}^{N-1} d_{m+n}^2}\right).$$

For example with $d_n = \sin(2\pi k n/N)$ and N=127, the probability that d affects the correlation by more than N/4 is bounded by $2 \exp(-127/32) \approx 0.038$.

The description above describes implementation aspects of DSSS modulation in the discrete setting in terms of sequences. The following description applies these concepts to continuous time domain signals. The following also describes implementations for communication using inaudible sound signals.

In typical indoor environments, multiple propagation paths from the broadcaster to the receiver are created by walls and objects in the room, which interfere in complicated ways. Compared to schemes like frequency shift keying (FSK), DSSS resolves the signal's time of arrival with much finer resolution, corresponding distinct paths to distinct correlation peaks. With DSSS signals, reflections tend to show up as discrete correlation times, which can be utilized or one can be used to decode the strongest path and ignore narrowband interference such as reflections. Additionally, DSSS has a large coding gain that enables decoding even at negative SNR levels, and it is particularly robust to narrowband interference. These properties enable the protocol to operate in multipath and noisy environments. While various implementations described herein deal with difficulties of indoor environments, these implementations also work in the outdoor environments.

As described in more detail below, in some implementations, for good inaudibility, the system uses single sideband filtering to remove the lower part of the spectrum. In some implementations, for reliability, the system performs acquisition based on modulated cross-correlation computed exhaustively over a large search domain, approximated using chunks, which separates the computation over start time versus frequency shift. In some implementations, the system performs an exhaustive search that provides a full acquisition image, where the two dimensions are frame index versus sample offset within the frame. As such, acquisition is amenable to image processing techniques for robustly determining the synchronization. In some implementations, for low latency, the system determines synchronization by an exhaustive correlation over a finely sampled grid so that the signal is immediately acquired, as opposed to conventional tracking-type algorithms. In some implementations, the system may denoise the acquisition image and analyze the acquisition image leveraging various image processing techniques.

FIG. 1 illustrates a block diagram of an example modulation system 100, according to some implementations. In some implementations, modulation system 100 includes a linear-feedback shift register (LFSR) 102 that generates a pseudo-random code sequence. In various implementations, modulation system 100 performs sinc interpolation 104 on the pseudo-random bits of code sequence.

Modulation system 100 also includes a mixer 106 and a sine wave generator 108. In various implementations, mixer 106 spreads a data signal 110 (labeled data wave 110 in FIG. 1) by multiplying data signal 110, a sine wave carrier generated by sine-wave generator 108, and the interpolated pseudo-random code sequence. In various implementations, an adder 112 adds a pedestal to data signal 110, which offsets data signal 110 or data wave 110 by a constant offset (e.g., 1, etc.). As a result, the data signal has a pedestal component.

Modulation system 100 also includes a single-sideband modulation (SSB) highpass filter 114 that upconverts the data signal. Modulation system 100 also includes a speaker 116 that outputs the data signal.

As described in more detail below, modulation system 100 implements a protocol that transmits data as sound. As such, the data signal being transmitted is ultrasonic. In various implementations, the amplitude-modulated code waveform is modulated up to ultrasonic frequency by multiplying it by a carrier sine wave. Further, it is optionally single-sideband filtered. For example, in some implementations, the system uses an 18.5 kHz carrier, and a code chip rate of 3 kHz. The modulated spectrum occupies 17 to 20 kHz (and a bit more with data modulation), which is inaudible to most humans yet within the range of speakers and microphones of most mobile devices. In various implementations, the single-sideband filter, if used, removes the lower sideband, leaving only frequencies above the carrier, 18.5 to 20 kHz, which is what is transmitted.

In various implementations, modulation system 100 transmits a short token to establish co-presence between users' cellphones or pair devices based on proximity. In contrast to mediums such as Bluetooth and Wi-Fi, ultrasound does not pass strongly through walls, making it well-adapted for co-presence since the broadcaster and receiver are in the same room. Data transmission using audible sound may be difficult socially, since some people nearby might hear it may find it distracting; and depending on the modulation scheme, it may be offensive. Ultrasound avoids these problems by using a spectrum outside the range of human hearing.

Figure 2:
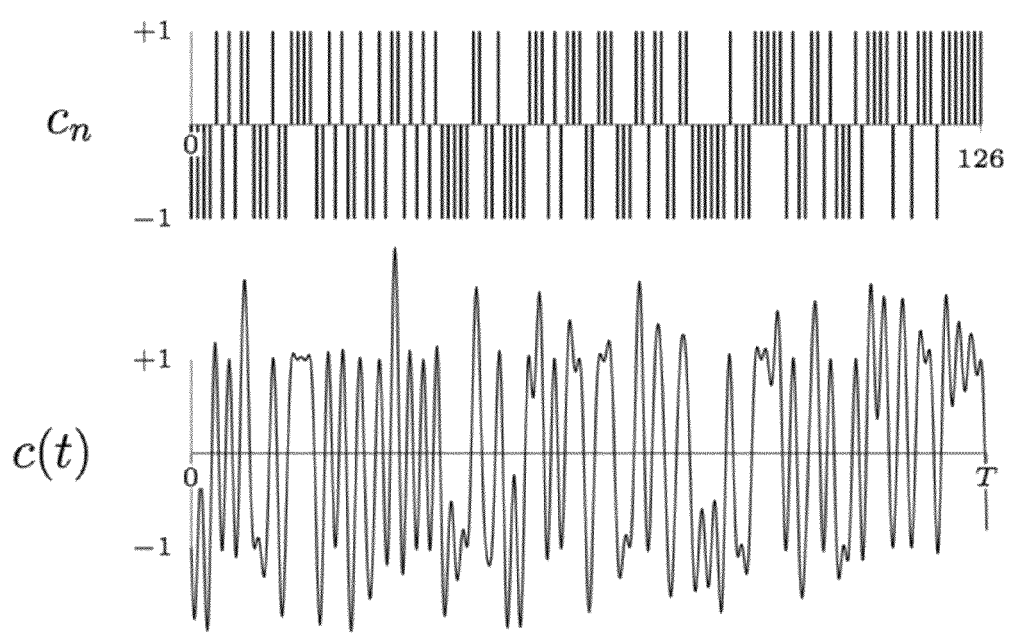
FIG. 2 illustrates example graphs showing discrete pseudonoise code sequence and a sinc interpolation of the pseudonoise code sequence, according to some implementations.

FIG. 2 illustrates example graphs 200 showing discrete pseudonoise code sequence and a sinc interpolation of the pseudonoise code sequence, according to some implementations. The graph labeled $c_n$ shows a discrete pseudonoise code sequence of period N. In some implementations, the code sequence $c_n$ has a period N=127 and its sinc interpolation c(t). The graph labeled c(t) shows a sinc interpolation of $c_n$ of period $T_s$.

The following describes a continuous code signal setting, which may apply to implementations described herein. In some implementations, let $T_s$ be the duration of one symbol. In various implementations, each time interval (Tm, T(m+1)) is one frame of the signal. The code sequence is sinc interpolated to obtain a $T_s$-periodic bandlimited function c(t), $$c(t) = \sum_{n=-\infty}^{\infty} c_n \frac{\sin(\pi(t/T_c - n))}{\pi(t/T_c - n)} = \sum_{n=0}^{N-1} c_n \frac{\sin(\pi(t/T_c - n))}{N\sin\left(\frac{\pi}{N}(t/T_c - n)\right)}. \quad (11)$$

The samples of $c_n$ are called chips, and $T_c := T_s/N$ is the duration of a chip where, N=127, $T_c$=16/48000≈333 μs, and $T_s$≈42 ms. The signal is bandlimited to $|f| \leq 1/(2T_c)$.

Note that after interpolation, the code signal is no longer almost orthogonal to all translations of itself. The continuous autocorrelation of the interpolated code signal is proportional to the sinc interpolation of the discrete autocorrelation (equation 4):

$$\frac{1}{T_s}(c \star c)(t) = -1 + \frac{(N+1)\sin(\pi t/T_c)}{N\sin(\pi t/T_s)}. \quad (12)$$

Suppose that c is transmitted with motion; then the receiver observes a dilated version $\tilde{c}$. For motion less than ±1 m/s, the difference between the correlation c☐$\tilde{c}$ and the autocorrelation c☐c is tolerable.

The following description involves data waves. In some implementations, let d(t) be the data signal in the continuous setting. Each length-$T_s$ frame of d encodes one information symbol k from an alphabet of size (K+1). Let k(m) be the symbol encoded on the mth frame.

Figure 3:
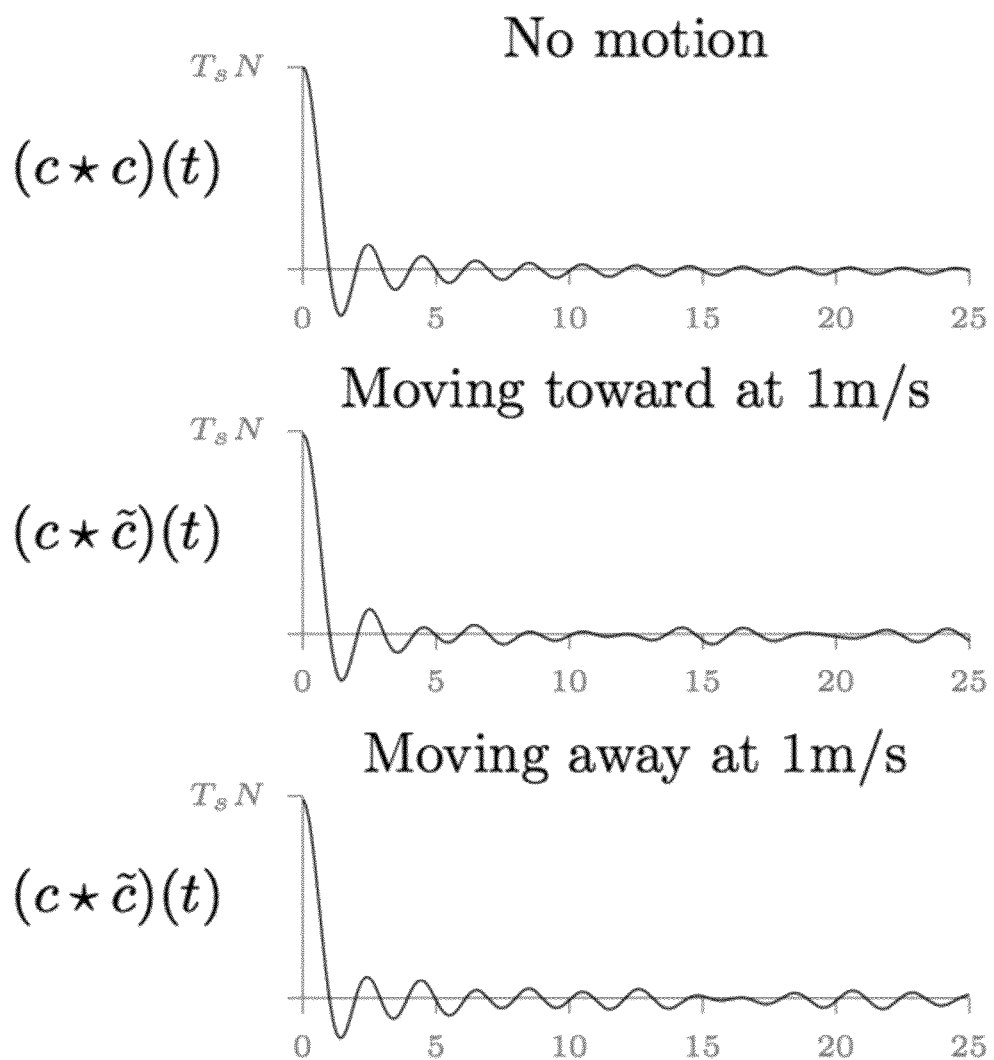
FIG. 3 illustrates example graphs showing various scenarios of lag, according to some implementations.

FIG. 3 illustrates example graphs 300 showing various scenarios of lag, according to some implementations. In some implementations, each graphs shows a lag in units of chips. The top graph shows a scenario where there is no motion, with continuous autocorrelation of the interpolated code signal (c☐c)(t). The middle graph shows a scenario with movement toward at 1 m/s, and the bottom graph shows a scenario with movement away at 1 m/s. As shown in the middle and bottom graph, $\tilde{c}$ is c dilated by ±1 m/s motion (approximately ±0.3%). Lag 0 is defined as when the centers of c and $\tilde{c}$ are aligned.

$$d(t) = d_{k(m)}(t), t \in [Tm, T(m+1)). \quad (13)$$

The data wave functions $d^0, \ldots, d^K$ are orthogonal sinusoids of different frequencies $$d^k(t) = \sin\left(\frac{2\pi}{T_s}(4+k)t\right), \quad k = 0, \ldots, K, t \in [0, T_s]. \quad (14)$$

This choice of data waves is attractive to limit the used spectral bandwidth and for continuity at the frame endpoints. More generally, ($d^k$) could be a set of real zero-mean orthogonal functions.

Analogous to equation 5, the data signal is added to the pedestal. In some implementations, the pedestal is a constant offset by one, then multiplied pointwise with the code to spread it:

$$c(t)(d(t)+1). \tag{15}$$

In the frequency domain, equation 15 corresponds by the convolution-multiplication property to $ĉ*d̂+ĉ$. The spectrum $d̂$ is spread by the spectrum $ĉ$; and this is the "spread spectrum" characteristic for which DSSS is named.

The "+1" pedestal in equation 15 spends more than half of the signal energy on a component that does not contribute to distinguishing between data values, which may seem less optimal in an information-theoretic sense. The pedestal, however, is optimal for synchronization. Without the pedestal, it would be much harder (in reliability and computational expense) to identify a good Doppler frequency and code phase. The sacrificed pedestal energy enables efficient scoring of all code phase and Doppler frequency combinations.

The following describes carrier modulation. In some implementations, the spread signal (equation 15) is modulated with a sine carrier $\sin(2\pi f_c t)$ and highpass filtered, $$x^{SSB} = h^{SSB} * x, \quad x(t) = \sin(2\pi f_c t)c(t)(d(t)+1), \tag{16}$$

where $h^{SSB}$ is highpass filter with cutoff $f_c$. In various implementations, this shifts the signal spectrum up by $f_c$ and keeps only the upper sideband. The carrier frequency $f_c$ is selected such that the number of carrier cycles per frame $Tf_c$ is an integer (e.g., 783, etc.). In various implementations, since (15) is real, the carrier-multiplied signal is Hermitian symmetric around $f_c$ and can be highpass filtered without loss to keep only the upper sideband above $f_c$. Ignoring the data wave, the bandwidth of $x^{SSB}$ is $[f_c, f_c+1/(2T_c)]$.

In some implementations, the system may perform crest factor reduction to order to increase the signal energy below the point of clipping. In some scenarios, equation 16 may already result in a fairly low crest factor (on the order of 3.5). As such, crest factor reduction is optional.

The preceding has described how to encode a sequence of symbols k(m). The following describes a token structure involving a higher-level task of reliably transmitting a token of a small fixed-length amount of data. First, the beginning of the token is marked with a "spacer" having symbol value K, which is reserved for this use. The spacer is followed by the data payload converted base-K to symbol values $s_0, s_1, \ldots, s_L-1 \in \{0, \ldots, K-1\}$. Last, as a limited form of error correction coding, a parity symbol is appended whose value in $\{0, \ldots, K-1\}$ is such that the sum of all token symbols modulo K is zero. This sequence of symbols is repeated indefinitely:

$$\ldots \text{spacer}, s_0, s_1, \ldots, s_L-1, \text{parity}, \text{spacer}, s_0, s_1, \ldots,$$
$$s_L-1, \text{parity}, \text{spacer}, s_0, s_1, \ldots, s_L-1, \text{parity}, \ldots.$$

The number of data symbols L is known to the decoder. In most scenarios, one token is sufficient for recognition. Under typical circumstances, three token repetitions are used, where one of the three tokens will be sufficient for successful transmission.

In various implementations, encoding is a computationally light operation. The encoded symbols can be precomputed and concatenated to form the token waves. In some implementations, full token waves may be precomputed and stored on a device with no computation capacity that only needs to broadcast a limited set of tokens. In some implementations, if precomputed token waves are used, an arbitrary token may be broadcast, where there are no changes to details of the encoding scheme (e.g., sample rate, chip length, etc.)

Figure 4:
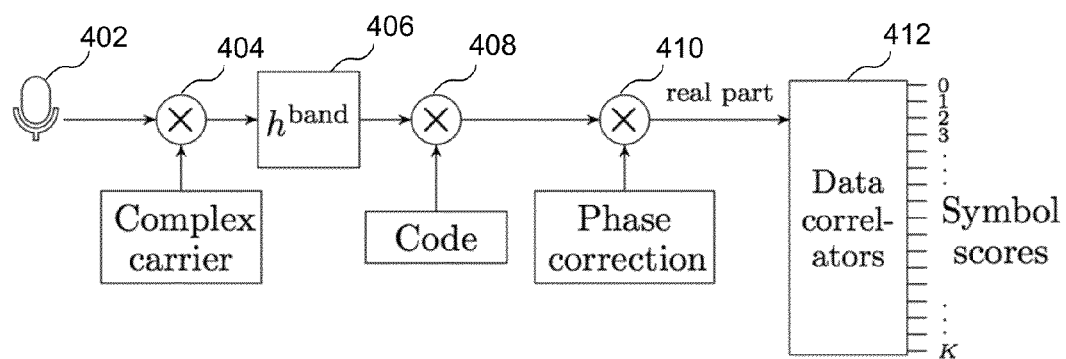
FIG. 4 illustrates a block diagram of an example demodulation, according to some implementations.

FIG. 4 illustrates a block diagram of an example demodulation system 400, according to some implementations. In various implementations, demodulation system 400 includes a microphone 402, a multiplier 404, an $h^{band}$ filter 406, multipliers 408 and 410, and data correlators 412. In various implementations, microphone 402 receives a data signal (e.g., data signal 110). Multiplier 404 multiplies the data signal with a complex carrier to downconvert the data signal. The $h^{band}$ filter 406 filters the downconverted data signal.

In various implementations, demodulation system 400 then approximates cross-correlation of the downconverted data signal and uses the cross-correlation to detect and synchronize with the symbols. In various implementations, demodulation system 400 performs synchronization at multiple levels: carrier frequency and phase, code phase (e.g., at what time does each symbol start), token phase (e.g., which symbol is the framing symbol); and ultimately system 400 acquires the data. Note that the terms system 400 and demodulation system 400 are used interchangeably.

After synchronization, multiplier 408 multiplies the downconverted data signal by a code sequence to despread the data signal. Multiplier 410 rotates the data signal into the real part to provide zero on average in the imaginary part. In various implementations, data correlators 412 correlate with rotating phasors.

In various scenarios, the biggest challenge in developing the protocol is synchronizing the locations of the frames on the receiving side. The code phase of the signal is unknown since there is no time synchronization with the broadcaster. Additionally, relative motion (which is tolerated to some extent with handheld devices) introduces Doppler shift, which offsets the observed carrier frequency, $$(\text{perceived frequency}) = \left(1 + \frac{v}{340\,m/s}\right)(\text{original frequency}), \tag{17}$$

where v is the relative velocity and 340 m/s is the approximate speed of sound near sea level. Moreover, there is no assumption that velocity is constant (the device users may be moving about over the course of the transmission). As such, in some implementations, system 400 continually estimates Doppler effect.

Searching over all combinations of offsets in time and frequency is a large space of possibilities to consider. Demodulation system 400 avoids taking a long time to acquire the signal. As such, unlike conventional lock-and-track DSSS receivers, demodulation system 400 exhaustively and concurrently evaluates all possibilities over a finely-sampled grid. A brute force correlation with so many possible signals would be too expensive, but an approximation achieves this with more moderate computation.

Figure 5:
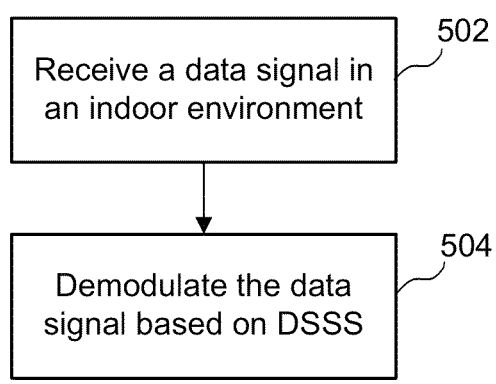
FIG. 5 illustrates an example simplified flow diagram for processing ultrasonic communication between devices, according to some implementations.

FIG. 5 illustrates an example simplified flow diagram for processing ultrasonic communication between devices, according to some implementations. Referring to both FIGS. 4 and 5, a method is initiated in block 502, where demodulation system 400 receives a data signal. In various implementations, the data signal is transmitted and received in an indoor environment.

In block 504, demodulation system 400 demodulates the data signal based on direct sequence spread spectrum (DSSS). As described in more detail below, the demodulating of the data signal includes immediately acquiring synchronization of the data signal based on an approximated cross-correlation of a first symbol of the data signal. Various implementations for demodulating the data signal are described in more detail below.

Figure 6:
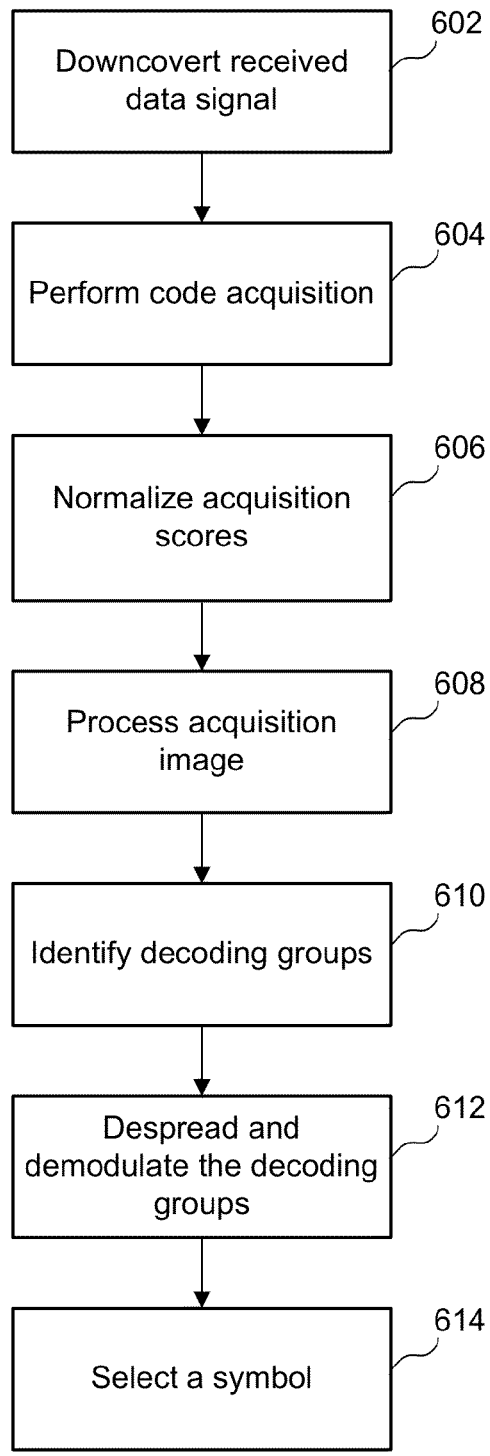
FIG. 6 illustrates an example simplified flow diagram for demodulating ultrasonic communication between devices, according to some implementations.

FIG. 6 illustrates an example simplified flow diagram for demodulating ultrasonic communication between devices, according to some implementations. Referring to both FIGS. 4 and 6, a method is initiated in block 602, where demodulation system 400 downconverts the received data signal. In some implementations, demodulation system 400 modulates the received signal by the carrier frequency to downconvert to complex baseband. In some implementations, demodulation system 400 resamples the baseband signal to a lower sample rate. Demodulation system 400 then applies a positive frequency filter to remove noise. Example implementations of the downconversion are described in more detail below. Demodulation system 400 also despreads the downconverted data signal.

The downconversion to complex baseband enables a substantial reduction in sample rate before continuing further processing. In some implementations, demodulation system 400 may downsample by a predetermined factor, while leaving plenty of samples per code chip. For example, with a code chip length is 16 samples at 48 kHz, or 4 samples after downsampling to 12 kHz, demodulation system 400 can measure timing with a resolution of ¼ code chip, which is plenty. This reduced sampling is a useful approximation for saving computation.

In some implementations, the whole signal is modulated up to around a 18.5 kHz carrier, where there are about 780 carrier cycles per symbol, which converts down to 0 cycles per symbol, except for Doppler effect. With the Doppler effect, there can be a rotation rate of up to 0.4% of 780 cycles, or plus and minus 3 cycles, at the complex baseband. A complex number can rotate in either direction, depending on the sign of the velocity, or carrier frequency offset due to Doppler.

In step 604, demodulation system 400 performs code acquisition. In some implementations, demodulation system 400 obtains acquisition scores during code acquisition. As described in more detail below, demodulation system 400 approximates cross-correlation of the data signal. In various implementations, demodulation system 400 performs the approximating based on demodulation system 400 partitioning a first detected symbol into multiple chunks and cross-correlating each chunk. In some implementations, demodulation system 400 detects a first symbol of the data signal, partitions the first symbol into multiple chunks, and approximates cross-correlation of each chunk.

In some implementations, demodulation system 400 computes modulated cross-correlation with the code wave at every combination of frame start translation and frequency shift. In various implementations, demodulation system 400 determines frequency uncertainty for one or more frequencies based on the approximated cross-correlation. Example implementations of the code acquisition are described in more detail below.

In step 606, demodulation system 400 normalizes acquisition scores. In some implementations, demodulation system 400 estimates the noise standard deviation from the average acquisition magnitude, and divides by this to obtain normalized acquisition scores. Example implementations of the normalization of acquisition scores are described in more detail below.

In step 608, demodulation system 400 processes the acquisition image. In some implementations, demodulation system 400 obtains one score for each frame start, maximizing over the frequency shift. Demodulation system 400 reshapes the image to obtain the acquisition image. In some implementations, demodulation system 400 applies image denoising techniques for noise reduction. In some implementations, demodulation system 400 may use any suitable dynamic programming algorithm to track a best path coherently. Example implementations of the processing of the acquisition image are described in more detail below.

In step 610, demodulation system 400 identifies decoding groups as long connected components with good scores.

In step 612, for each time in a decoding group, demodulation system 400 despreads and demodulates the decoding groups to extract the data wave, and to compute inner products to obtain confidences for the represented symbol.

In step 614, demodulation system 400 selects a symbol. In some implementations, the system aggregates symbol confidences over token repetitions, finds high-confidence combinations of symbols that satisfy parity condition and have exactly one spacer symbol.

The following describes down-conversion to baseband, according to some implementations described herein.

Let y(t) denote the received signal, which may be modeled as $$y(t)=\Box h^{SSB} * \Box \tilde{c} \cdot c \cdot (d+1)))(t-\tau 0)+v(t), \quad (18)$$

where $\tau 0$ is the code phase, $\tilde{c}(t)=\sin(2\pi(f_c-\delta_0)t)$ is the perturbed carrier with Doppler shift $\delta_0$, and $v(t)$ is additive channel noise.$\Box$ In some implementations, the received signal is first modulated to cancel the effect of the carrier up to the Doppler shift $\delta_0$. To define the raw baseband signal, $$b^{raw}(t)=y(t)e^{-i2\pi f_c t}. \quad (19)$$

Modulation has the effect of shifting the spectrum down by $f_c$ so that the remaining modulation is $\delta_0$. The signal spectrum is in $[0, 1/(2T_c)]$, which is much lower than the input sample rate. To save computation in subsequent processing, the raw baseband signal is resampled to a lower rate (e.g., subsampled by a factor of 15).

To remove the aliased spectrum at $-2f_c$ and reduce out-of-band noise, the raw baseband signal is filtered $$b=h^{band} * b^{raw}, \quad (20)$$

where $h^{band}$ is an 11-tap complex FIR filter with approximately unit gain over $[0,1/(2T_c)]$ and attenuating negative frequencies $f<0$ and higher frequencies $f>1/(2T_c)$. Let $f_b$ be the sample rate of b. The filter is designed by truncating with a sine window the impulse response of the target frequency response $$\begin{cases} 0 & -f_b/2 < f < -\delta, \\ 1 & -\delta \le f \le f^{knot}, \\ 1 - \dfrac{f-f^{knot}}{f_b/2 - f^{knot}} & f^{knot} < f < f_b/2, \end{cases} \quad (21)$$

where $f^{knot}=1/(2T_c)+\delta$ and $\delta$ is a small positive parameter.

Figure 7:
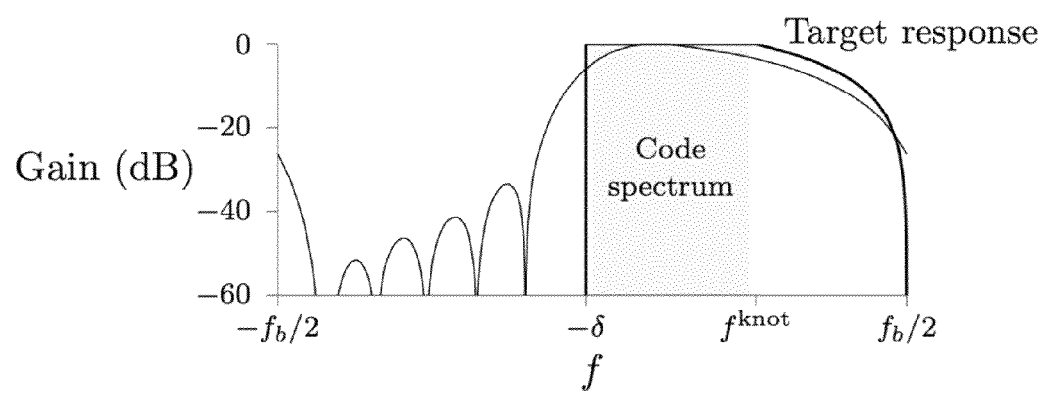
FIG. 7 illustrates an example graph showing a frequency response and the target response, according to some implementations.

FIG. 7 illustrates an example graph 700 showing a frequency response and the target response, according to some implementations. As shown, code spectrum contains a frequency response of $h^{band}$ (thin line) and the target response (thick line).

The following describes acquisition, according to some implementations described herein. In some implementations, for each code position, the system 400 evaluates every velocity. Each velocity receives a score, the "power" or squared magnitude of the complex correlation. In some implementations, the system 400 selects a consistent sequence of symbol times and frequencies.

Having shifted the signal to baseband, the system 400 determines the code phase $\tau_0$ and Doppler offset $\delta_0$ of the signal. To define the acquisition score, the square magnitude of modulated cross-correlation, $$a(\tau,\delta)=|\int_0^{T_s} e^{i2\pi\delta t} c(t) b(t+\tau) dt|^2. \quad (22)$$

This function is maximized over $(\tau,\delta)$, which should be large when synchronized at $(\tau_0+nT_s, \delta_0)$ and small otherwise.

Conventional DSSS receivers lock and track the carrier phase and code phase. These algorithms search the $(\tau,\delta)$-space efficiently, but have the disadvantage in that it takes some time to acquire the signal. In various implementations, because low latency is critical, the system 400 instead performs the maximization as a brute force search, sampling $a(\tau,\delta)$ exhaustively over a grid of $\tau$ and $\delta$ combinations. This allows synchronization to be achieved as soon as possible.

The code phase $\tau$ is sampled densely at 12 kHz, and $\delta$ over a fixed set $\Delta$ of 17 test frequencies. Specifying a maximum motion tolerance of 1 m/s, the maximum possible Doppler shift is about 54 Hz, or 2.35 cycles per frame. The system 400 samples these frequencies uniformly with a spacing of 0.3 cycles per frame, $\Delta=\{0, \pm 0.3, \pm 0.6, \ldots, \pm 2.4\}$. Note that in these examples and others described herein, the actual values will depend on the particular implementations.

While the primary effect of Doppler shift is an offset in the perceived carrier frequency, it also compresses or dilates the perceived duration of a frame. Relative motion of up to $\pm 340/(2N+1)$ m/s can be tolerated for a difference of less than half a chip, and the difference in correlation is small (see FIG. 5). For this reason, demodulation system 400 selects the code sequence length to be N=127, which is fairly short compared to typical lengths used in DSSS, so that the effect on the frame duration of motion up to $\pm 340/(2\cdot 127+1) \approx \pm 1.3$ m/s can be ignored.

Ignoring for the moment noise, filtering, and the contribution from the data signal d(t), the baseband signal is approximately $$b(t) \approx \varphi e^{-i2\pi\delta_0 t} c(t-\tau_0), \quad \varphi = \frac{1}{i2} e^{-i2\pi(f_c - \delta_0)\tau_0}. \quad (23)$$

Substituting into equation 22 obtains $$a(\tau,\delta)=|\int_0^{T_s} e^{i2\pi(\delta-\delta_0)t} c(t)c(t+\tau-\tau_0) dt|^2. \quad (24)$$

When $\delta=\delta_0$, it reduces to the squared autocorrelation $$a(\tau,\delta_0)=|\square|(c\square c)(\tau-\tau_0)|^2. \quad (25)$$

In various implementations, the result is large only when $\tau=\tau_0+nT_s$. In the other dimension, setting $\tau=\tau_0$ obtains $$a(\tau_0, \delta) \approx \left| \int_0^{T_s} e^{i2\pi(\delta-\delta_0)t} dt \right|^2 = \left| \frac{\cos(\pi(\delta-\delta_0)T_s)}{\pi(\delta-\delta_0)} \right|, \quad (26)$$

where the system 400 has approximated $c(t)^2 \approx 1$. When $\delta \neq \delta_0$, the modulation factor varies in sign over the interval, so $a(\tau_0, \delta) < a(\tau_0, \delta_0)$ from partial cancellation. Therefore, $a(\tau, \delta)$ is largest at $(\tau_0, \delta_0)$.

Figure 8:
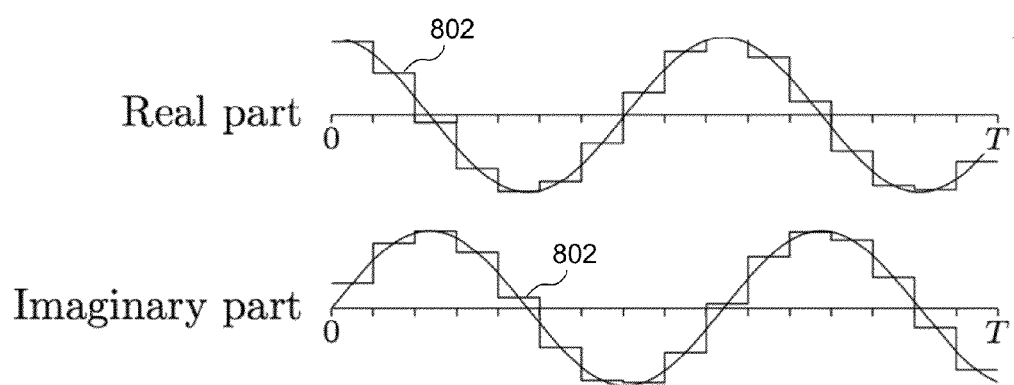
FIG. 8 illustrates graphs showing chunks, according to some implementations.

FIG. 8 illustrates graphs 800 showing chunks, according to some implementations. In various implementations, demodulation system 400 partitions an interval of the data signal, or code signal, into portions referred to as chunks 802. Graphs 800 include real and imaginary parts. While 16 chunks are shown, the actual number of chunks will depend on the particular implementations. In various implementations, demodulation system 400 approximates the cross-correlation as having a constant phase over each chunk. Graphs 800 show a caricature of the chunked approximation of equation 27, where the data signal, or code signal, includes chunks 802. The modulation factor $\exp(i2\pi\delta t)$ is approximated as having constant phase over each chunk.

In various implementations, demodulation system 400 uses a code of a predetermined number of chips (e.g., 127 chips) that repeats once per symbol. Demodulation system 400 performs the approximation such that the stretching of the N-chip code sequence (e.g., 127-chip code sequence) due to Doppler velocity is negligible. As such, demodulation system 400 considers all Doppler values with a single code sequence correlation. For example, if the Doppler velocity is 0.4%, the stretch is plus or minus 0.5 code chips. If the code sequence is aligned at the middle of the symbol, it will be off by up to 0.25 chip at each end, or 1 sample, which will not reduce the correlation very much. Various implementations enable a decoder to handle motion on the order of 1 m/s, enough to handle hand motions and some walking Actually, 1% of the speed of sound is 3.4 m/s, a running pace. A comfortable walk is 1.4 m/s, which is about 0.4% of the speed of sound.

Implementations, demodulation system 400 correlates with rotating phasors that go through −3 to 3 cycles in a symbol time, in increments of something like 0.25 cycle/symbol, but that in itself would be expensive, with a symbol being 127*4=508 samples long. As such, demodulation system 400 effectively downsamples again, in the "despread" domain where the signal bandwidth is lower, by converting the 508 samples to 16 "chunks". In some implementations, if demodulation system 400 loses a bit of signal correlation for high velocities, that will bias demodulation system 400 to prefer lower velocities. This bias is still workable, as people are usually not moving much, especially indoors.

In some implementations, demodulation system 400 may enforce a stricter consistency criterion, accounting for the interaction of frequency shift and timing offset from symbol to symbol, using a dynamic-programming search.

Direct computation of equation 22 is prohibitively expensive. If b is sampled with N samples per frame, it would cost $2N|\Delta|$ complex multiplies for each time offset $\tau$. In some implementations, demodulation system 400 approximates it in the following way to make real-time decoding tractable. In some implementations, demodulation system 400 partitions the interval $[0,T_s]$ into M (e.g., M=16) chunks of length $T_s/M$ (or L/M samples), and, as indicated above, demodulation system 400 approximates the cross-correlation as having constant phase over each chunk, $$a(\tau, \delta) \approx \left| \frac{1}{T_s} \sum_{m=0}^{M-1} e^{i2\pi\delta \frac{T_s}{M}(m+\frac{1}{2})} \int_{\frac{T_s}{M}m}^{\frac{T_s}{M}(m+1)} b(t+\tau)c(t) dt \right|^2. \quad (27)$$

The approximation amounts to computing M cross-correlations with the L/M-sample code signal chunks and evaluating the summation for each $\delta$. The cost is $(L+M|\Delta|)$ complex multiplies for each $\tau$, a large reduction in computation. The approximation error in evaluating the integral is bounded proportionally to the number of cycles over the frame $|\delta|T_s$ times $\sigma/M^{3/2}$, where $\sigma$ is the standard deviation of $b(t+\tau)c(t)$ over the frame.

This approximation reduces the cost enough to make the brute force search feasible. Though even with the approximation, the majority of the receiver computation cost is computing modulated cross-correlations.

The following describes a theorem, which may apply to some implementations described herein. In some implementations, the approximation error in evaluating the integral with equation 27 is bounded as $$\frac{1}{T}\left|\int_0^T e^{i2\pi\delta t}f(t)dt - \sum_{m=0}^{M-1} e^{i2\pi\delta\frac{T}{M}(m+\frac{1}{2})}\int_{\frac{T}{M}m}^{\frac{T}{M}(m+1)} f(t)dt\right| \le$$

$$\frac{\pi|\delta|T}{\sqrt{3}\,M^{3/2}}\left(\frac{1}{T}\int_0^T |f(t)-\mu|^2 dt\right)^{1/2}, \text{ where } \mu = \frac{1}{T}\int_0^T f(t)dt.$$

The following is a proof of the theorem above. The error over one panel [0,T/M] is $$E = \frac{1}{T}\left|\int_0^{T/M} e^{i2\pi\delta t}f(t)\,dt - e^{i\pi\delta T/M}\int_0^{T/M} f(t)\,dt\right|$$

$$= \frac{1}{T}\left|e^{i\pi\delta(t+\frac{T}{2M})}\int_0^{T/M}\left(e^{i\pi\delta(t-\frac{T}{2M})} - e^{-i\pi\delta(t-\frac{T}{2M})}\right)f(t)\,dt\right|$$

$$= \frac{2}{T}\left|\int_0^{T/M} \sin\left(\pi\delta\left(t-\frac{T}{2M}\right)\right)f(t)\,dt\right|.$$

Since $$\int_0^{T/M} \sin\left(\pi\delta\left(t-\frac{T}{2M}\right)\right)dt = 0,$$

the error is unaffected by a constant offset $\mu$ to f(t). Applying Cauchy-Schwarz obtains $$E \le \frac{2}{T}\sqrt{\frac{T}{2M} - \frac{1}{2\pi\delta}\sin\left(\pi\delta\frac{T}{M}\right)}\,\|f - \mu\|_{L^2}.$$

Since $\sin(x) \ge x - \frac{1}{6}x^3$ for $x \ge 0$, the argument of the square root factor can be bounded as $$\frac{T}{2M} - \frac{1}{2\pi\delta}\sin\left(\pi\delta\frac{T}{M}\right) \le \frac{T}{2M} - \frac{1}{2\pi\delta}\left(\pi\delta\frac{T}{M} - \frac{1}{6}\left(\pi\delta\frac{T}{M}\right)^3\right) = \frac{\pi^2\delta^2 T^3}{12M^3}.$$

Summing the error bounds over the panels yields the result, $$\frac{\pi|\delta|\sqrt{T}}{\sqrt{3}\,M^{3/2}}\sum_{m=0}^{M-1}\|f-\mu\|_{L^2[m,\frac{T}{M}(m+1)]} = \frac{\pi|\delta|T}{\sqrt{3}\,M^{3/2}}\left(\frac{1}{T}\int_0^T |f(t)-\mu|^2 dt\right)^{1/2}.$$

In some implementations, with M=16 and $|\delta|T_s \le 2.4$, the error bound is $$\frac{2.4\pi}{64\sqrt{3}}\sigma \approx 0.068\sigma.$$

This approximation reduces the cost and is sufficiently accurate to make brute force search feasible. Though even with the approximation, the majority of the receiver computation cost is in approximating modulated cross-correlations.

The following describes normalization, according to some implementations described herein. In various scenarios, real environments often have significant nonstationary noise sound sources. The code signal is not exactly orthogonal to itself, having a small amount of off-peak correlation, which appears in the acquisition scores as an unwanted noise-like component with power proportional to the signal power. To combat these effects, the acquisition scores are normalized by an estimate of the local baseband noise standard deviation. Normalization also has the benefit that subsequent processing is invariant to the scaling of the received signal, since scaling the input proportionally scales the noise level.

Demodulation system 400 normalizes acquisition scores by $$a^{normalized}(\tau,\delta) = a(\tau,\delta)/\mu(\tau), \mu = h^{normalize} * \sum_{\delta\in\Delta} a(\cdot,\delta), \quad (28)$$

where $h^{normalize}$ is a recursive lowpass filter with Z-transform $$H^{normalize}(z) = z^d\left(\frac{1-p}{1-pz^{-1}}\right)^2, d = \frac{2p}{1-p}. \quad (29)$$

This filter is used to compute $\mu(\tau)$, a local estimate of the mean value of $a(\tau,\delta)$. Since the mean of a is proportional to the standard deviation of the baseband noise, the normalization (equation 28) scales noise in a locally-adaptive manner to a consistent level.

The following describes image-based acquisition, according to some implementations described herein. In some implementations, observing the $T_s$-periodic structure of the signal, a useful representation of acquisition is to maximize over frequency as a function of $\tau$, then wrap the result into an image $$A(i,\varphi) = \max_{\delta\in\Delta} a^{normalized}(iT_s + \varphi, \delta), i \in \mathbb{Z}, \varphi \in [0, T_s), \quad (30)$$

where i is the frame index and $\phi$ is the phase within the frame. Due to the circular ambiguity of phase, the top and bottom image boundaries are arbitrary and should be interpreted as wrapping to the adjacent column according to one-dimensional order.

$T_s$-periodic structures appear as horizontal features in this image. If $a^{normalized}(\tau_0)$ is large, then it is likely that $a(\tau_0+iT_s)$ are also large, appearing in A as a ridge of large values (i, $\phi_0$), $\phi_0=\tau_0$ mod $T_s$. Thanks to the code signal's finely localized autocorrelation, the peak of this ridge is sharply defined with a main lobe width of $T_c(\approx 333~\mu s)$.

In some implementations, the acquisition image is denoised by applying a 2D box blur filter. This two-dimensional filtering aggregates scores across different frames based on the assumption of the signal's periodic structure. In addition to suppressing noise, filtering has the effect of bridging small gaps to form connected ridges of large values.

Figure 9:
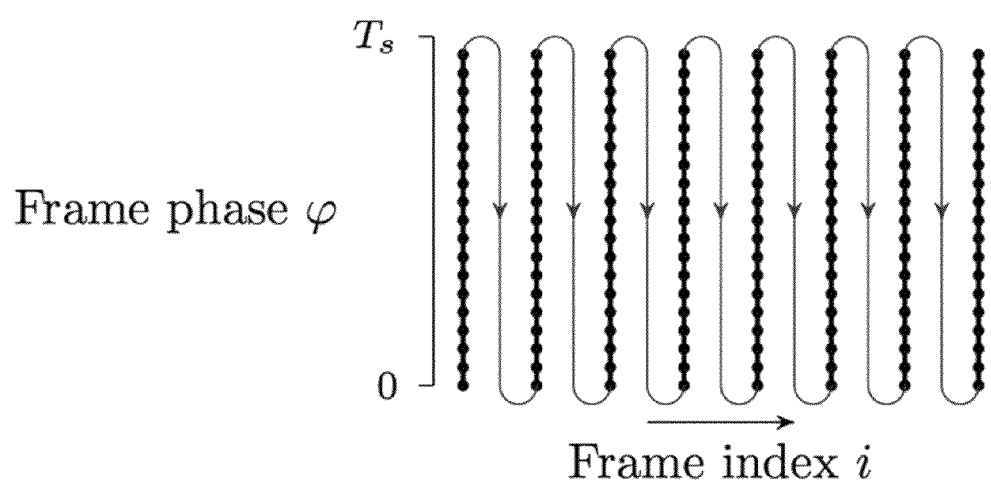
FIG. 9 illustrates a graph showing wrapping an acquisition image, according to some implementations.

FIG. 9 illustrates a graph 900 showing wrapping an acquisition image, according to some implementations. In various implementations, image values below a threshold are set to zero. The resulting image is very sparse, with surviving nonzeros corresponding (hopefully) to the signal. The nonzero pixels tend to form horizontally-oriented ridges. Each ridge corresponds to a propagation path from the broad-caster to the receiver. The ridge length and average pixel magnitude indicate the strength of the path. Paths that travel further (due to reflections) have longer delay, appearing as ridges with greater frame phase. A nonzero slope in the ridge indicates Doppler shift.

These ridges, being sharply defined, enable demodulation system 400 to distinguish distinct paths as distinct lines, enabling reliable decoding in real environments with multiple paths. This ability to separate multiple paths is the main advantage of DSSS over other modulation schemes.

If no nonzeros survive, it indicates that no usable signal was heard for decoding, which can be used as a simple decision rule for whether a broadcast is active.

The following describes despreading and demodulation, according to some implementations described herein. The remaining nonzero locations in the acquisition image are mostly times that correspond to frames in the signal. What remains is to despread and demodulate the data waves from these frames to decode the token.

The crest of each ridge is identified by finding the point with maximal score in each contiguous run of nonzeros. These points are clustered into decoding groups. Each point in a decoding group, corresponding to a particular frame start time τ, is used to determine symbol score values for that frame. Demodulation system 400 still needs to select the best phase μ to go with the frame to rotate the complex samples to a real baseband signal to decode.

In various implementations, demodulation system 400 detects the pedestal component in the data signal and correlates the pedestal. Demodulation system 400 then uses the pedestal correlation to determine which phase to measure the data symbol wave correlations. Demodulation system 400 then determines which phase to measure data symbol wave correlations.

Demodulation system 400 uses the phase that maximizes the mean of the real component, using the pedestal correlation to determine the phase:

$$q(t) = e^{i2\pi\delta t}c(t)b(t+\tau) \quad (31)$$

$$\mu = \frac{1}{T}\int q(t)dt$$

$$\bar{q} = \frac{\bar{\mu}}{|\mu|}q$$

$$s_k = \langle Re\{\bar{q}\}, d^k\rangle, k = 0, \ldots, K.$$

The first line despreads and demodulates to extract the data wave plus pedestal $(1+d^k)$ up to complex scale factor. The next two lines correct the phase so that the average phase is real and positive. The last line computes inner products with the data waves to obtain a symbol score for each possible symbol value k. The symbol score $s_k$ is the confidence that the symbol in this frame is k. The Doppler offset δ is locally tuned by maximizing the modulated cross-correlation over an extended frame, though it might be determined using the acquisition scores computed earlier.

Demodulation system 400 correlates the real samples in each (phase adjusted) symbol interval with the symbol waveforms (e.g., using 17 orthogonal sinusoids) to get the symbol scores. At that point, demodulation system 400 selects the best scoring symbol at each position, or does a more elaborate soft-decision error-correcting-code decoding. Demodulation system 400 performs a simple version of the latter, using the constraint of one extra parity-check symbol, to pick a few most likely symbol sequences (or token values).

A simple decoding algorithm would be to select the largest score as the decoded symbol value, $$k^\star = \underset{k}{\mathrm{argmin}}\, s_k. \quad (32)$$

However, to take advantage of token repetitions, the inner products are tabulated and combined in the next step for noise reduction.

The following describes symbol selection, according to some implementations described herein. To aggregate over token repetitions, the scores $s_k$ are tabulated for symbol value at each decoding time. As there may be multiple token repetitions, scores modulo the token period are added. The (i,j)th entry in the resulting table represents the confidence that the jth symbol in the token has symbol value i. The scores are thresholded and normalized such that each column has unit sum. The nonzeros of the resulting table describe decoded token candidates. The token candidates (equation 4) having the largest summed score; and valid spacer and parity are identified and returned as the decoding result.

Figure 10:
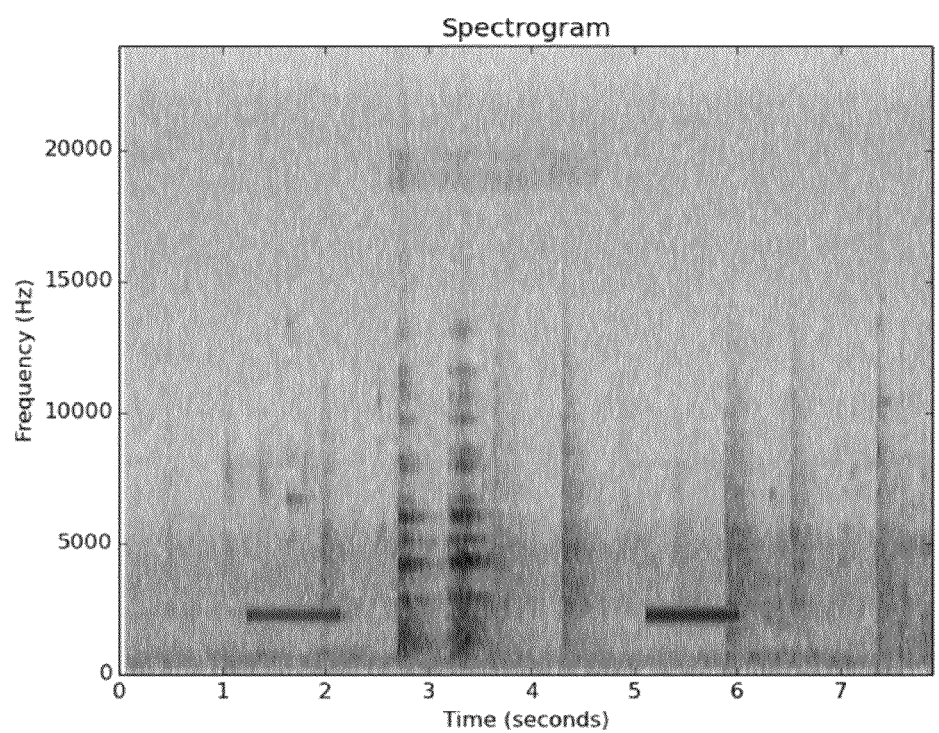
FIG. 10 illustrates example results showing a spectrogram, according to some implementations.
Figure 11:
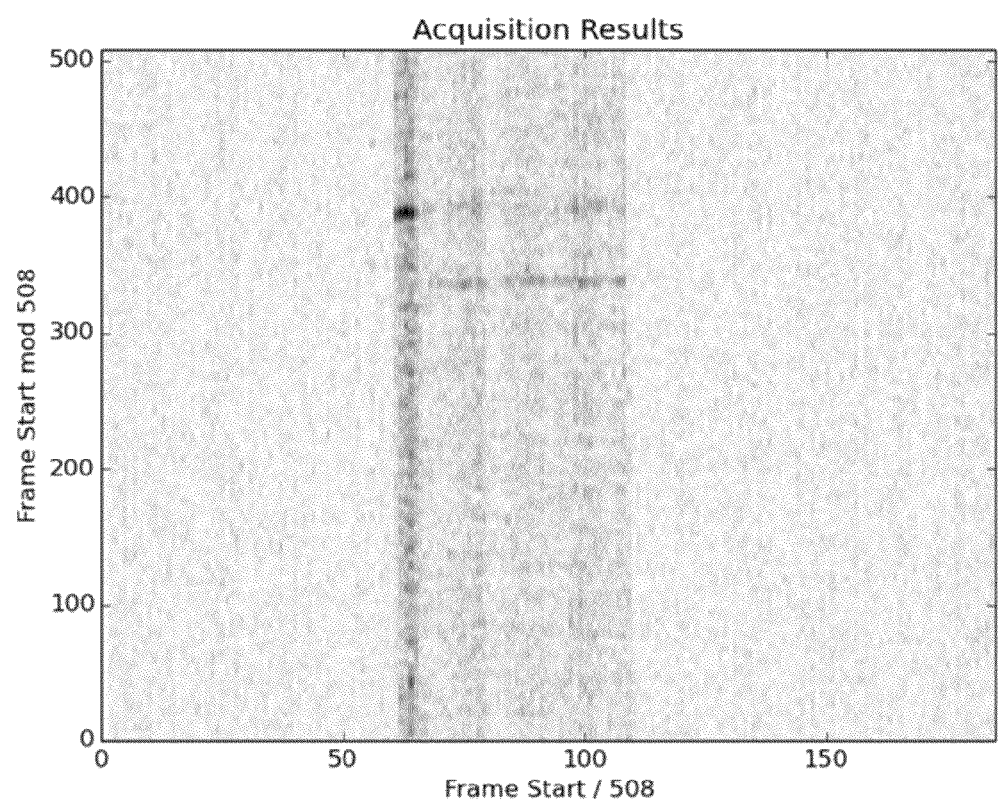
FIG. 11 illustrates example results showing raw acquisition, according to some implementations.
Figure 12:
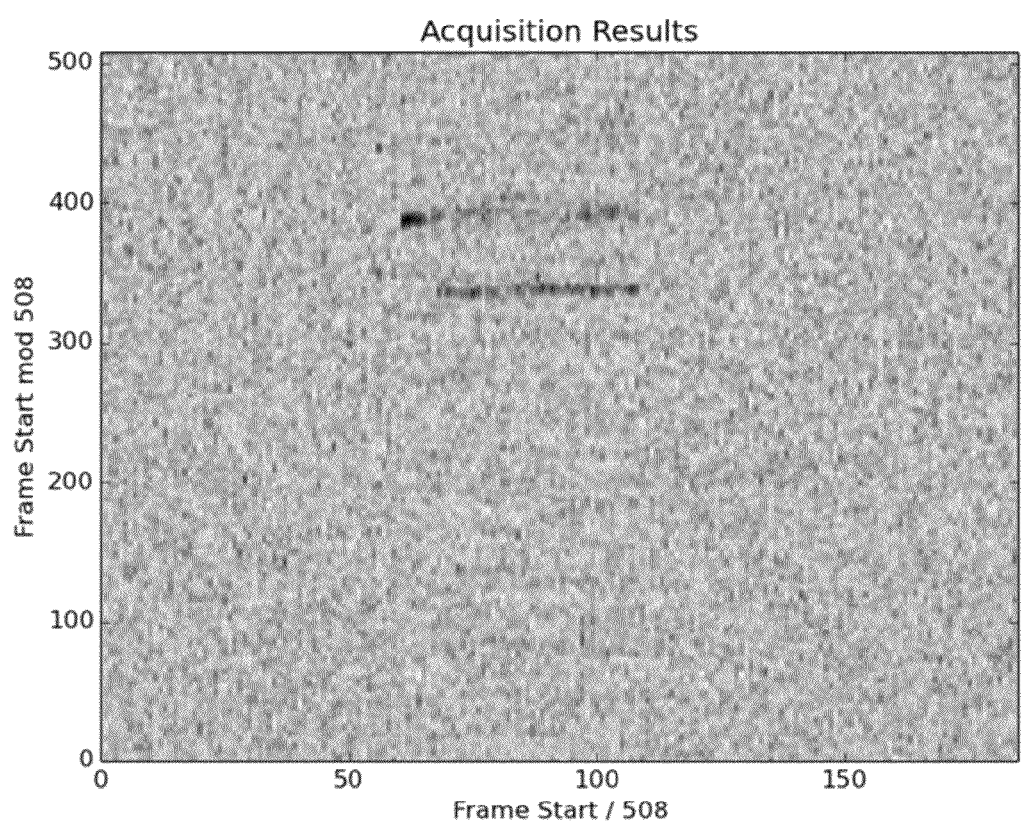
FIG. 12 illustrates example results showing a normalized acquisition, according to some implementations.
Figure 13:
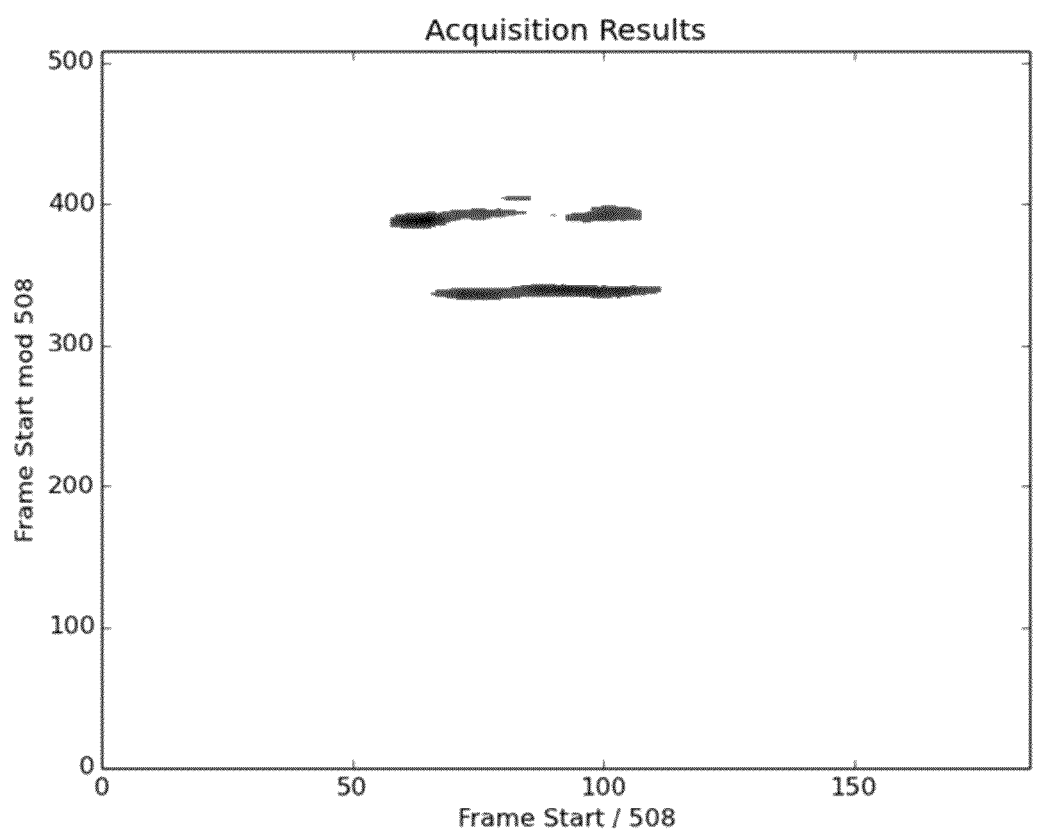
FIG. 13 illustrates example results showing blurred acquisition, according to some implementations.

FIGS. 10 through 13 illustrate example decoding results based on 48 kHz SSB. FIG. 10 illustrates example results 1000 showing a spectrogram, according to some implementations. FIG. 11 illustrates example results 1100 showing raw acquisition, according to some implementations. FIG. 12 illustrates example results 1200 showing a normalized acquisition, according to some implementations. FIG. 13 illustrates example results 1300 showing blurred acquisition, according to some implementations.

In some implementations, the demodulation may use a state machine for helping resolve communications among multiple devices. In some implementations, the state machine uses a strategy that is to listen first, and only transmit if no other device is detected to be transmitting. It is still possible for several devices to start at about the same time, and not be able to hear each other. For example, it is difficult for one device to hear another device when the former device is broadcasting, as the microphone signal will be dominated by what the device is sending out over its speaker, thereby masking the signal coming from other devices). Since collisions are possible, the state machine controls a strategy for how long to listen, how long to transmit, what to do after you stop, etc.

Implementations described herein may have various applications. For example, a token is broadcast to the nearby devices based on DSSS modulation. In some implementations, the data is encoded using a DSSS, which may be similar to techniques used by global positioning system (GPS) satellites.

Figure 14:
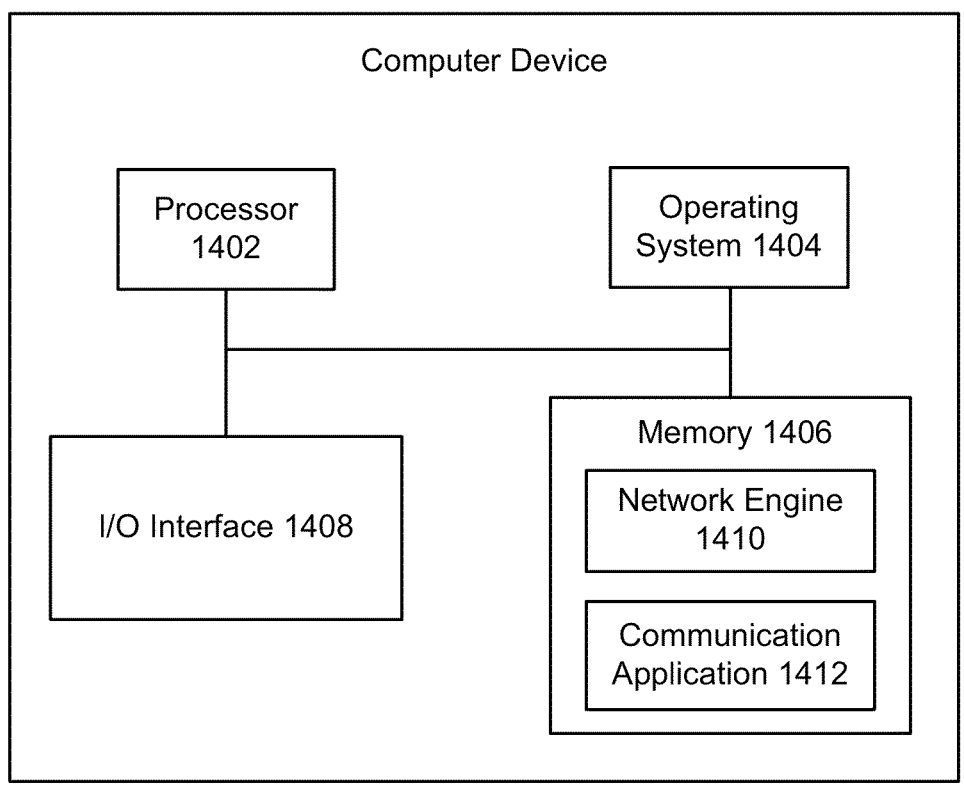
FIG. 14 illustrates a block diagram of an example server device, which may be used to implement the implementations described herein.

FIG. 14 illustrates a block diagram of an example server device 1400, which may be used to implement the implementations described herein. For example, server device 1400 may be used to implement the modulation system or demodulation system 400 described herein, as well as to perform the method implementations described herein. In some implementations, server device 1400 includes a processor 1402, an operating system 1404, a memory 1406, and an input/output (I/O) interface 1408. Server device 1400 also includes a network engine 1410 and a communication application 1412, which may be stored in memory 1406 or on any other suitable storage location or computer-readable medium. Communication application 1412 provides instructions that enable processor 1402 to perform the functions described herein and other functions.

For ease of illustration, FIG. 14 shows one block for each of processor 1402, operating system 1404, memory 1406, I/O interface 1408, network engine 1410, and communication application 1412. These blocks 1402, 1404, 1406, 1408, 1410, and 1412 may represent multiple processors, operating systems, memories, I/O interfaces, network engines, and media applications. In other implementations, server device 1400 may not have all of the components shown and/or may have other elements including other types of elements instead of, or in addition to, those shown herein.

Implementations described herein provide various benefits. For example, implementations provide a protocol for ultrasonic sound communication using DSSS modulation. Implementations provide a system that is practical, reliable and efficient. Implementations utilize a pedestal added to the data waves, which enables robust and efficient synchronization. Implementations compute a brute force correlation over a grid of combinations of Doppler shifts and code phases, and a piecewise-constant approximation is used to enable this with more moderate computation. Implementations provide quick synchronization and can transfer small amounts of data in noisy and multipath environments.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While demodulation system 400 is described as performing the steps as described in the implementations herein, any suitable component or combination of components of demodulation system 400 or any suitable processor or processors associated with demodulation system 400 may perform the steps described.

Although the description has been described with respect to particular embodiments thereof, these particular embodiments are merely illustrative, and not restrictive. For example, numerous example implementations have been described with various specific parameter values. Such values are example values for illustrative purposes, and actual values will depend on the particular implementations. Concepts illustrated in the examples may be applied to other examples and implementations. For example, while various implementations described address difficulties of indoor environments, these implementations and others also apply in outdoor environments.

Features under a single heading need not be implemented in same implementation together. Also, features under different headings may be used together from implementations described under other headings.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A method comprising:
   receiving a data signal, wherein the data signal is transmitted and received in an indoor environment; and
   demodulating the data signal based on direct sequence spread spectrum, wherein the demodulating of the data signal comprises:
   detecting a first symbol of the data signal;
   partitioning the first symbol into a plurality of chunks;
   approximating cross-correlation of each chunk, wherein the approximating is based on the partitioning of the first symbol into the plurality of chunks;
   downconverting the data signal; and
   despreading the downconverted data signal.

2. The method of claim 1, wherein the data signal has a pedestal component.

3. The method of claim 1, wherein the data signal is ultrasonic.

4. The method of claim 1, wherein the demodulating of the data signal further comprises immediately acquiring synchronization of the data signal based on the approximated cross-correlation of the first symbol of the data signal.

5. The method of claim 1, wherein the data signal has a pedestal component, and wherein the pedestal component offsets the data signal by a constant offset.

6. The method of claim 1, wherein the approximating of the cross-correlation is based on a constant phase over each chunk.

7. The method of claim 1, further comprising determining a frequency uncertainty for a plurality of frequencies based on the approximated cross-correlation.

8. The method of claim 1, wherein the demodulating of the data signal comprises:
   detecting a pedestal component in the data signal;
   correlating the pedestal; and
   determining which phase to measure data symbol wave correlations.

9. A system comprising:
one or more processors; and
logic encoded in one or more tangible media for execution by the one or more processors and when executed operable to perform operations comprising:
receiving a data signal, wherein the data signal is transmitted and received in an indoor environment; and
demodulating the data signal based on direct sequence spread spectrum, wherein the demodulating the data signal comprises:
detecting a first symbol of the data signal;
partitioning the first symbol into a plurality of chunks;
approximating cross-correlation of each chunk, wherein the approximating is based on the partitioning of the first symbol into the plurality of chunks;
downconverting the data signal; and
despreading the downconverted data signal.

10. The system of claim 9, wherein the data signal has a pedestal component.

11. The system of claim 9, wherein the data signal is ultrasonic.

12. The system of claim 9, wherein, to demodulate the data signal, the logic when executed is further operable to perform operations comprising immediately acquiring synchronization of the data signal based on the approximated cross-correlation of the first symbol of the data signal.

13. The system of claim 9, wherein the data signal has a pedestal component, and wherein the pedestal component offsets the data signal by a constant offset.

14. The system of claim 9, wherein the approximating of the cross-correlation is based on a constant phase over each chunk.

15. The system of claim 9, wherein the logic when executed is further operable to perform operations comprising determining a frequency uncertainty for a plurality of frequencies based on the approximated cross-correlation.

* * * * *